United States Patent [19]

Doemen et al.

[11] Patent Number: 4,482,849
[45] Date of Patent: Nov. 13, 1984

[54] METHOD AND DEVICE FOR ALIGNMENT OF A BRUSHLESS D.C. MOTOR

[75] Inventors: Benno Doemen; Rolf Müller, both of St. Georgen, Fed. Rep. of Germany

[73] Assignee: Papst-Motoren GmBH & Co., K.G., St. Georgen, Fed. Rep. of Germany

[21] Appl. No.: 361,059

[22] Filed: Mar. 23, 1982

[30] Foreign Application Priority Data

Dec. 30, 1982 [DE] Fed. Rep. of Germany ....... 3111387

[51] Int. Cl.³ .......................................... H02K 23/00
[52] U.S. Cl. ................................... 318/254; 318/254; 318/138
[58] Field of Search .................. 318/138, 254 A, 254; 29/393, 396, 398; 310/49, 156, DIG. 3, 68 B, 46

[56] References Cited

U.S. PATENT DOCUMENTS 3,891,905  6/1975  Müller ............................ 318/138 X
3,961,211  6/1976  Vergues .......................... 310/46 X
4,099,104  7/1978  Müller ........................ 318/254 A X
4,344,023  8/1982  Yokobori et al. ............... 318/138 X

FOREIGN PATENT DOCUMENTS 1087268  8/1960  Fed. Rep. of Germany .
2319579  10/1973  Fed. Rep. of Germany .
1434192  5/1976  United Kingdom .

Primary Examiner—J. V. Truhe
Assistant Examiner—Patrick Keane
Attorney, Agent, or Firm—Fitch, Even, Tabin & Flannery

[57] ABSTRACT

A method and device are provided for substantially reducing the effect of a low frequency varying torque resulting from a characteristic asymmetric switching of a magnetic flux-sensitive control member when the control member is used to sense the rotating position of a rotor in a brushless d.c. motor.

14 Claims, 13 Drawing Figures

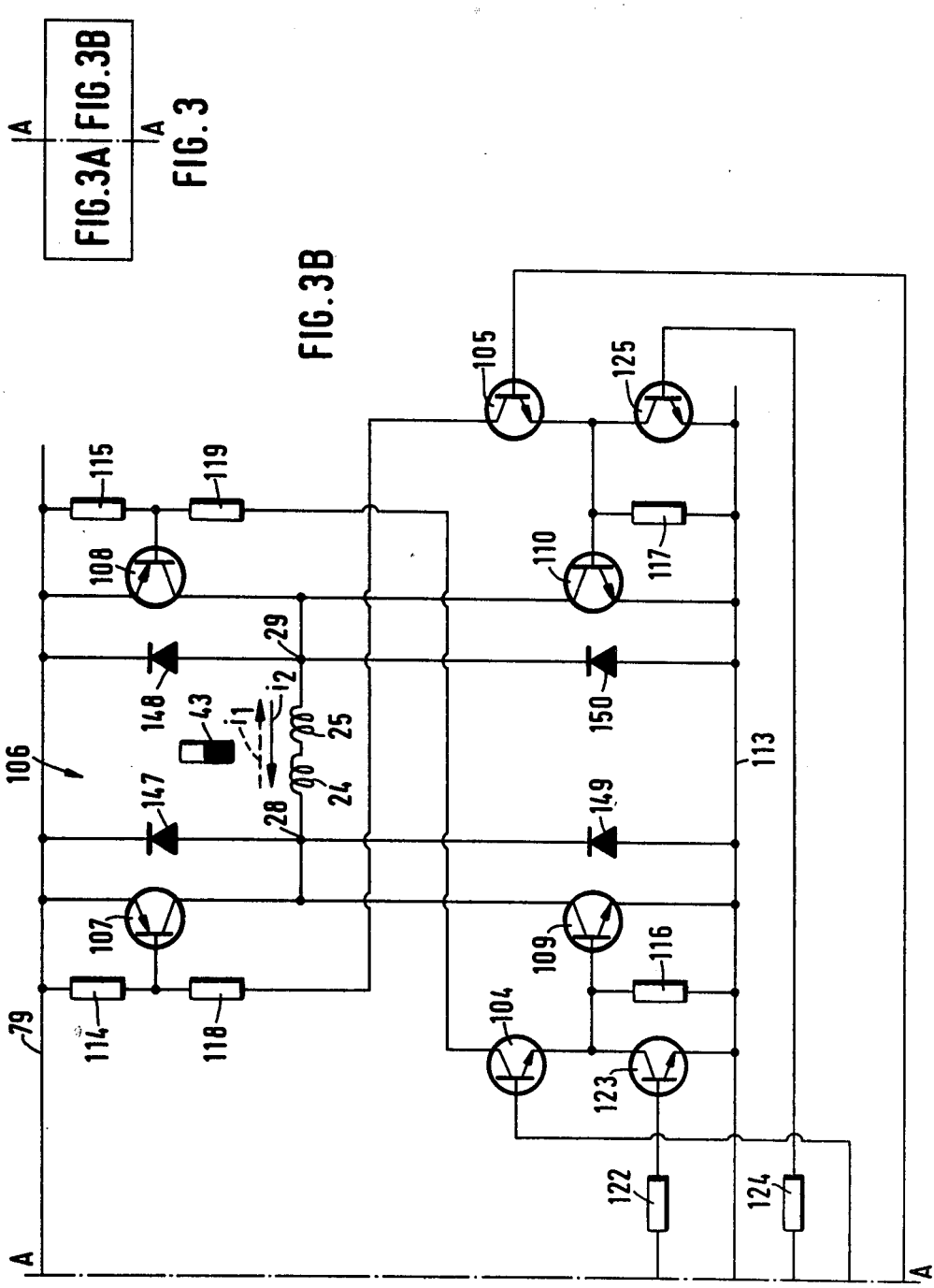

METHOD AND DEVICE FOR ALIGNMENT OF A BRUSHLESS D.C. MOTOR

This invention relates to a brushless d.c. motor having a permanent magnet rotor and more particularly to the commutation control sensor therefor.

A brushless d.c. motor is shown and described in U.S. Pat. No. 4,115,715, issued Sept. 9, 1978. That description is incorporated herein by reference. In motors of this type which use a magnetic flux-sensitive control member, such as a Hall-IC, to sense the rotating position of the rotor, a property of the well-known Hall-ICs, their switching asymmetry, causes some undesirable results. This is their property to react in a slightly different way to positive and negative magnetic fields. This property becomes more significant as the size of the motor is increased, because the resistance of the windings becomes smaller in relation to the inductance of the windings as the size of the motor increases. In a two-pulse motor this property can, for example, cause one of the current signals from the Hall-IC to become about twice the other, from which an undesirable varying torque of low frequency results in the motor.

It is therefore an object of the present invention to minimize this varying torque.

Other objects and advantages of the invention will become apparent and the invention better understood by reference to the following detailed description read in conjunction with the accompanying drawings in which:

FIGS. 3, 3A and 3B are each a part of a schematic of a circuit for the operation of the motor illustrated in FIGS. 1 and 2, the relation between the two parts being shown in FIG. 3;

Figure 4:
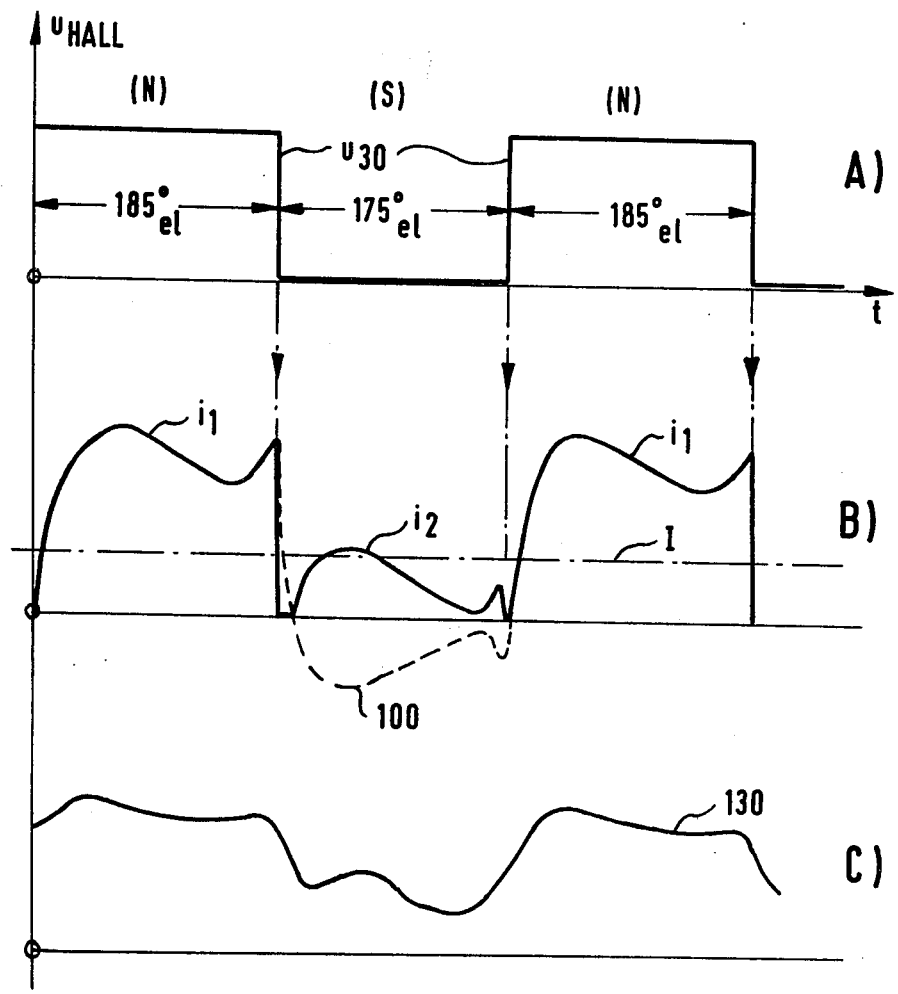
FIGS. 4A to 4C are graphs depicting the operation of the motor illustrated in FIGS. 1 to 3 without alignment according to this invention.

Briefly, when using a Hall-IC for controlling alternating stator current pulses $i_1$, $i_2$ of a brushless direct current major, such a Hall-IC is generally characterized by a slight switching asymmetry. That is, it may react in a different way on a north pole than on a south pole. As a result, current pulses $i_1$, $i_2$ (FIG. 4B) will be of different amplitudes, especially in the larger motors. This in turn causes a varying driving torque 130 on the motor (FIG. 4C). In order to avoid this effect, an alignment is done by either affecting the magnetic field to which the Hall-IC responds, or by affecting the reluctance of the magnetic lines of force in the flow path in which the Hall-IC is inserted. The positioning of a permanent magnet piece 59 (FIGS. 5 and 6) in a specified relationship with respect to Hall-IC 30 affects the magnetic field which acts on the Hall-IC, and the positioning, on the other hand, of a soft iron piece 175 (FIGS. 8 and 9) with respect to the Hall-IC 174 affects the reluctance of the magnetic path in which the Hall-IC 174 is located.

Figure 1:
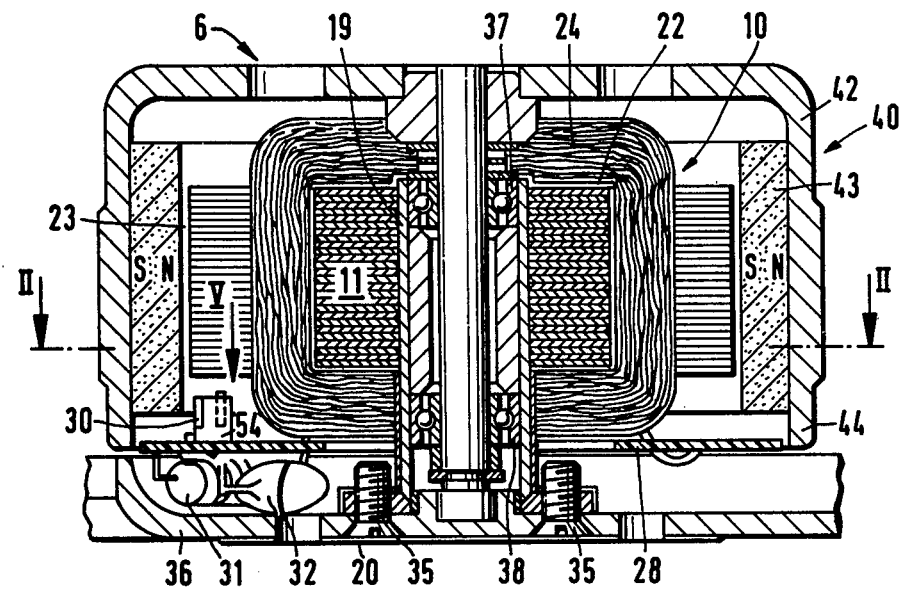
FIG. 1 is a sectional view of a two-pulse brushless d.c. motor constructed in accordance with this invention, as viewed along line I—I of FIG. 2.
Figure 2:
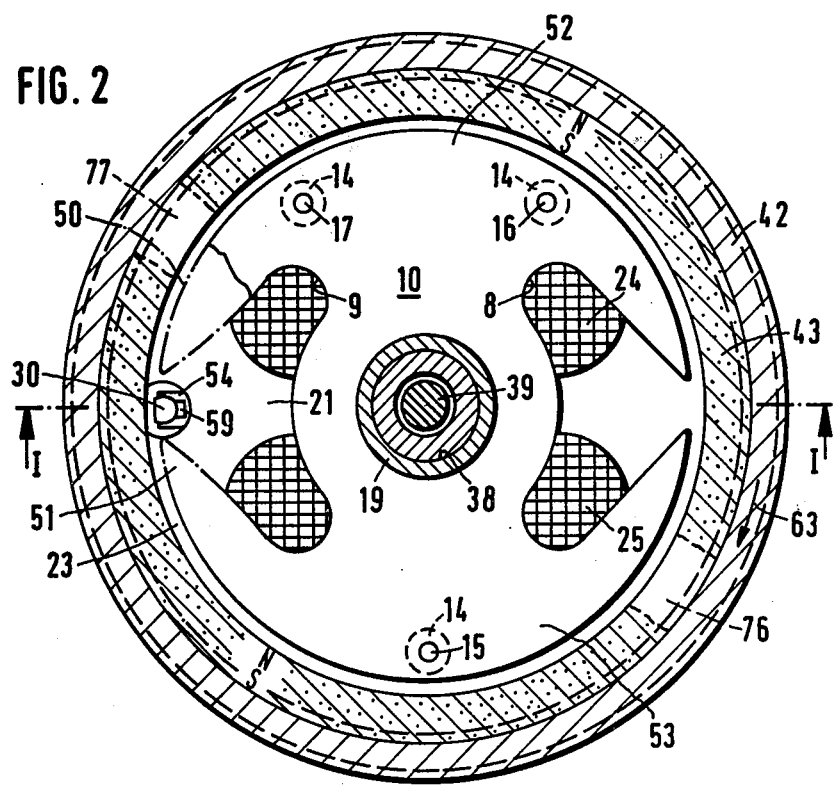
FIG. 2 is a sectional view of the motor illustrated in FIG. 1 and as viewed along line II—II of FIG. 1.

More specifically, in a two-pulse brushless direct current motor 6 shown in the embodiment of FIGS. 1 and 2, reference number 10 shows an inner stator whose stack of laminations 11 has a lamination cut which is set forth in particular in U.S. No. 3,873,897. A trapezoidal rotor magnetization is adjusted to the lamination cut. The motor 6 is an external rotor motor, but it should be understood that this invention, however, is also applicable in the same way for internal motors. The stack of laminations 11 is held together by three pins 15, 16, 17, each provided with an enlargement 14. The motor 6 also has a center recess with a bearing tube 9 clamped therein, which is provided at its one end with a mounting flange 20. In slots 8 and 9 of the stack of laminations 11, two stator windings 24 and 25 are wound which do not over lap each other and which result in a low axial length of the motor. A space 21 free of windings is formed between the windings 24 and 25 in the slots 8 and 9, as best seen in FIG. 2. A printed circuit board 28 made of a suitable insulating material is mounted at the lower ends of the pins 15 and 17. The board 28 provides a printed circuit directly connecting the terminals of the stator windings 24 and 25. Furthermore, this circuit board 28 carries the entire electric circuit for controlling the currents in windings 24 and 25. The current in the windings is commutated according to the rotor position by means of a sensor 30 mounted on board 28 in response to the magnetic field. In the illustrated embodiment, the sensor 30 is a Hall-IC. FIG. 1 schematically shows two electronic elements 31 and 32 which are soldered on the circuit board 28 and which are representative of the elements forming the circuit.

The stator arrangement is fixed by its flange 20, as shown in FIG. 1, and by means of screws 35 on a motor support structure 36. This may be, for example, at the central portion of a conventional axial fan blade designed for the cooling of electronic apparatus. Such an axial fan generally has a predetermined height of approximately 38 mm.

In the bearing tube 19 are two spaced apart ball bearings 37 and 38, and a rotor shaft 39 is located therein carrying at its upper end a soft iron rotor bell 42 of an external rotor 40. The rotor bell 42 open covers the stator 10. A continuous annular rotor magnet 43 is located in the rotor bell 42. This magnet 43 is radially magnetized as indicated in FIGS. 1 and 2 by the letters N (north pole) and S (south pole).

Narrow pole gaps 76 and 77 of the rotor magnet 43 are provided.

The Hall-IC 30 is located in the opening between the two stator windings 24 and 25, near pole tips 50 and 51 of the stator laminations between two stator poles 52 and 53. The pole tips 50 and 51 enclose the left slot 9 and form between them a relatively narrow slot opening for passing the stator windings 24 and 25 therethrough. As is evident from FIG. 2, the stator 10 is symetrical with respect to its central point.

The Hall-IC 30 is press fitted into a mold of plastic 54 mounted on the board 28. It is shown in particular in FIGS. 5 and 6 and has the form of a wing-chair, that is, the well-known form of an upholstered seat with lateral wings.

The mold 54 includes a circular base plate 55 with enlargement 56 extending downwards into corresponding recesses of the board 28 or of another support structure and so fixing the position of the mold 54. From the base plate 55 a mounting extends upwards that is provided with a recess 58 for a form-fit reception of the Hall-IC 30 and of a permanent magnet piece 59. The latter is movably placed in a guide channel 62 provided in its bottom side with a stop 63. A spacer 64 designates the distance between the bottom side of the Hall-IC 30 and the base plate 55.

Two laterals wings 65 and 66 of the support 54 are slightly and firmly grip the Hall-IC 30. The bottom side of the Hall-IC 30 is provided with a pair of wire leads 67 (only one of them is shown) which are soldered to the strip conductors of the printed circuit board 28 at point 68 at the same time the Hall-IC 30 and the mold 54 are attached to the board 28.

The permanent magnet piece 59 is correctly polarized and then pushed into the channel 62 in accordance with a following described procedure, and then the position of the permanent magnet piece 59 is fixed by means of a drop of an adhesive 71 so that it is no longer movable in the channel 62.

FIG. 3 shows a commutation circuit controlled by the Hall-IC 30. This circuit is described in a copending application U.S. Ser. No. 210,409, filed Nov. 25, 1980 and is therefore not further described in this application.

The circuit presented in FIG. 3 comprises a commutation element 72, a current regulator 73, and a power gate designed as a bridge circuit 106. The current regulator 73 measures the voltage drop across a resistor 74 which carries the total current of the motor 6. The regulator then causes two transistors 123 and 125 to become conductive when a certain amount of current is exceeded. When these two transistors are conductive, as will be seen, the current is cut off in the windings 24 and 25 of the motor. The function of the current regulator 73 will not be described in more detail because it is not necessary to the understanding of this invention and it is set forth in particular in the aforementioned application.

Figure 3A:
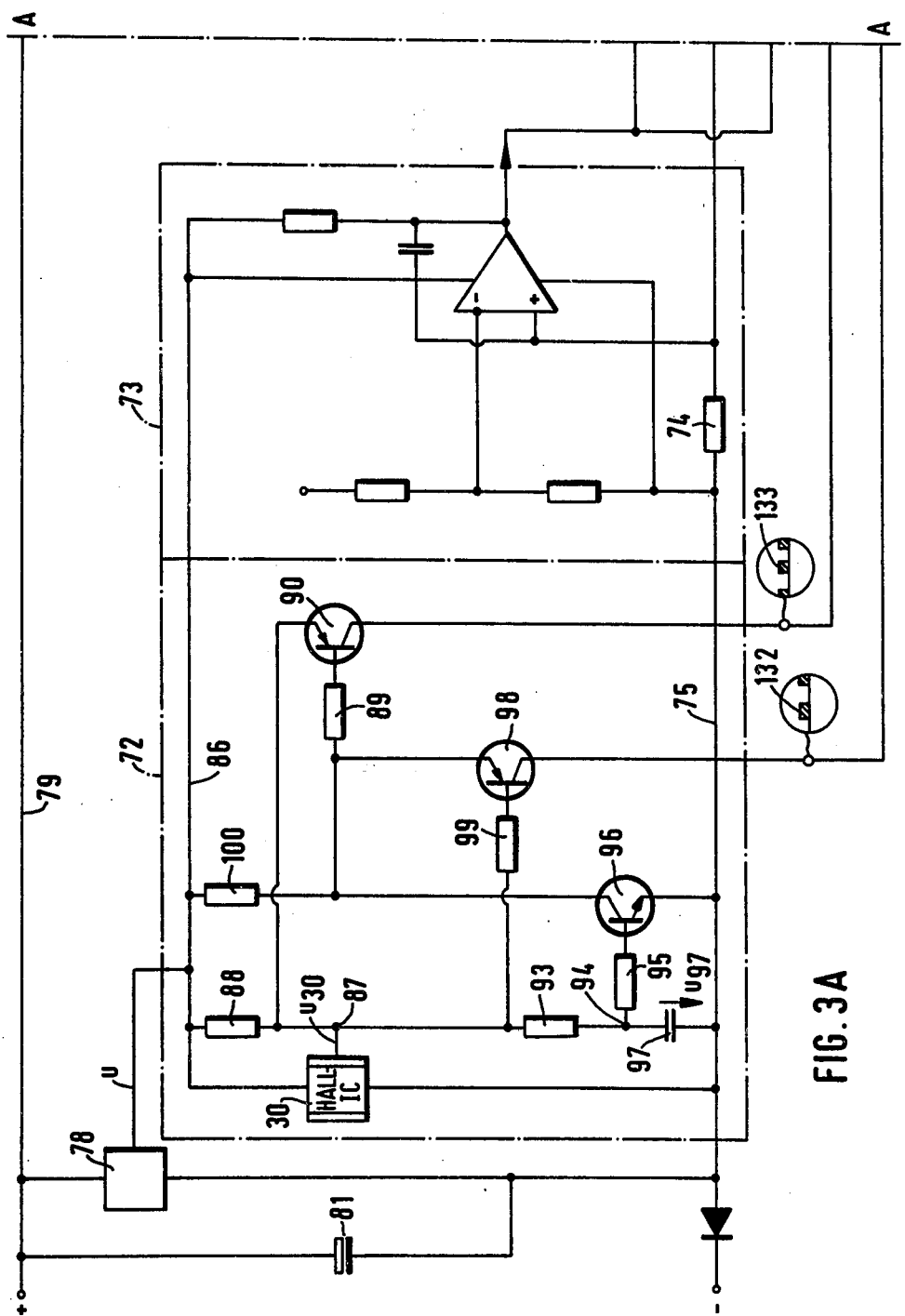

As shown in FIG. 3A, the Hall-IC 30, the commutation element 72, and the current regulator 73 are connected to the negative bus 75 and to a positive bus 86 supplied by a voltage regulator 78. The voltage regulator 78 is connected to a positive supply bus 79 in parallel with a capacitor 81.

According to this invention, the alignment of the entire circuit, which preferably is done by including the voltage regulator 78, offers advantages in such that the components of the voltage regulator possess, as to their output voltages, tolerances which can differ individually from piece to piece. It can be proved that these differing output voltages also influence the switching thresholds of the Hall-ICs in such a way that an alignment according to this invention compensates the influences from the output voltages of the voltage regulator 78 at the same time.

A resistor 88 leads from the output 87 of the Hall-IC 30 to the positive bus 86, a resistor 99 is connected to the base of a pnp transistor 98, and a resistor 93 is connected to a node 94 which is connected in turn to the base of an npn transistor 96 through a resistor 95, and to the negative bus 75 through a capacitor 97. Furthermore, the output 87 is connected to the emitter of a pnp transistor 90, the base of which is connected to the emitter of a transistor 98 through a resistor 89. The base of the transistor 90 is connected to the collector of the transistor 96 and, through a resistor 100, to the positive bus 86. The emitter of transistor 96 is connected to the negative bus 75.

The collector of the transistor 90 is connected to the base of an npn transistor 104 and the collector of the transistor 98 is connected to the base of an npn transistor 105. The transistors 104 and 105 serve as the drive of the bridge circuit 106, which comprises four power transistors 107, 108, 109 and 110. The transistors 107 and 108 are pnp transistors and 109 and 110 are npn transistors. The emitters of the transistors 107 and 108 are each connected to the positive bus 79; and the emitters of the transistors 109 and 110 to a negative bus bar 113 which is connected to the negative bus 75, through a current sensing resistor 74. The collectors of the transistors 107 and 109 are connected to each other and to the left terminal of the series connected stator windings 24 and 25. The collectors of the transistors 108 and 110 are also connected to each other and to the right terminal of the series connected stator windings 24 and 25. Recovery diodes 147 to 150 are, as illustrated, connected across the emitter-collector-line of each of the power transistors 107 to 110, respectively. The bases of each of the transistors 107 to 110 are connected to the corresponding emitter through one of the resistors 114 to 117, respectively. A resistor 118 leads from the base of the transistor 107 to the collector of the transistor 105, the emitter of which is connected to the base of the transistor 110, so that the power transistors 107 and 110 of the bridge circuit 106 are placed diagonally opposite each other and become conductive when the transistor 105 is switched on. In the same way, a resistor 119 leads from the base of the transistor 108 to the collector of the transistor 104, the emitter of which is connected to the base of the transistor 109 in such a way that the power transistors 108 and 109 are placed diagonally opposite each other and become conductive when the transistor 104 is switched on. When an adequate current passes through the stator windings 24 and 25 connected in series, the current $i_1$ flowing when the transistors 107, 110 become conductive, and the current $i_2$ flowing when the transistors 108, 109 become conductive.

From the output of the current regulator 73 a resistor 122 leads to the base of an npn transistor 123 and a resistor 124 leads to the base of an npn transistor 125. The collector-emitter-line of the transistor 123 is connected between the emitter of the transistor 104 and the negative bus bar 113. In the same way, the emitter collector-line of the transistor 125 is connected between the emitter of the transistor 105 and the negative bus bar 113. Thus, when the transistors 123 and 125 become conductive by a signal of the current regulator 73, they block both power transistors 109 and 110, that is the lower half of the full bridge 106, and current does not flow in the windings 24 and 25.

When the motor 6 is not yet aligned by means of the permanent magnet 59 (FIGS. 5 and 6), it works in combination with the commutation element 72 as follows:

The output pulses $u_{30}$ of the Hall-IC 30 (compare FIG. 4A) are directly transmitted to the emitter of the transistor 90 and to the base of transistor 98. These two transistors serve as conjunctive members and drive in their turn the two driving transistors 104 and 105 of the bridge circuit 106.

Furthermore, the output pulses $u_{30}$ of the Hall-IC 30 are transmitted to a time-delay device consisting of the resistor 93 and the capacitor 97. The voltage $u_{97}$ at the capacitor controls the transistor 96. The voltage has a lagging rise and a lagging drop so that the pulses indeed have the same frequency, but they are offset in time. The voltage $u_{97}$ controls the voltage at the collector of the transistor 96, and this voltage is transmitted to the base of transistor 90 and to the emitter of the transistor 98.

A sequence of controlling pulses 132 (FIG. 3A) is obtained at the collector of transistor 98, and a sequence of controlling pulses 133 is obtained at the collector of transistor 90. An interpulse period lies in each case between the two pulses 132 and 133 which are otherwise chose as to time, so that in each case the conducting power transistors, for example, 107 and 110, can become non-conductive before the two other power transistors 108 and 109 become conductive and viceversa. These controlling pulses 132 and 133 are described further in the aforementioned pending application, U.S. Ser. No. 210,409, in particular FIG. 4A.

As an example in operation, when a north pole of the rotor magnet 43 is acting on the Hall-IC 30, as shown in FIG. 2, the two power transistors 107 and 110 become conductive by a pulse 132, and a current $i_1$ flows through the windings 24 and 25 so that the upper stator pole 52 becomes a south pole and the lower stator pole 53 a north pole. Accordingly, the rotor 40 begins to rotate in the clockwise direction as indicated by the arrow 63 (FIG. 2).

Otherwise, when the south pole of the rotor magnet 43 is acting on the Hall-IC 30, the voltage $u_{30}$ will be about zero, the two power transistors 108 and 109 become conductive by a pulse 133, and a current $i_2$, being opposite to current $i_1$, flows through the windings 24 and 25 so that the upper stator pole 52 becomes a north pole and the stator pole 53 a south pole.

When the switching asymmetry of the Hall-IC 30 causes the positive portion, for example, of the output voltage $u_{30}$ to become longer than the following gap, as described in FIG. 4A in a ratio of 185° to 175°, the current $i_1$ becomes essentially stronger than current $i_2$. This has the same effect as if both currents $i_1$ and $i_2$ were of equal strength, but a direct current I (FIG. 4B) were continuously passing through the stator windings 24 and 25.

Figure 5:
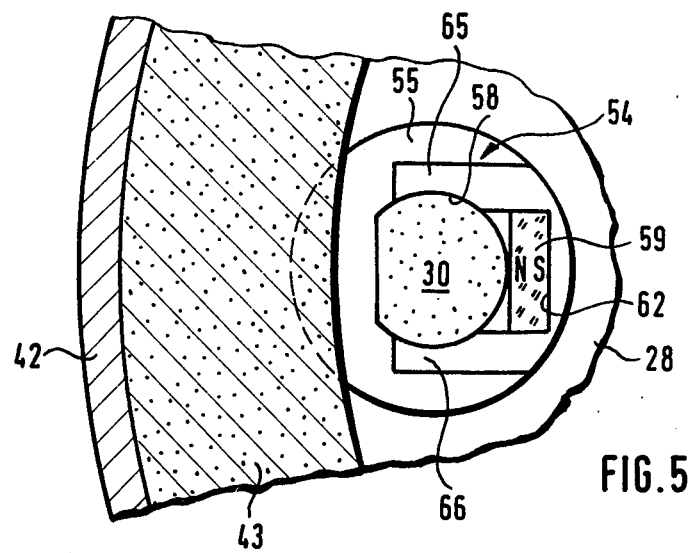
FIG. 5 is an enlarged fragmentary sectional view as taken in the direction of arrow V of FIG. 1.
Figure 6:
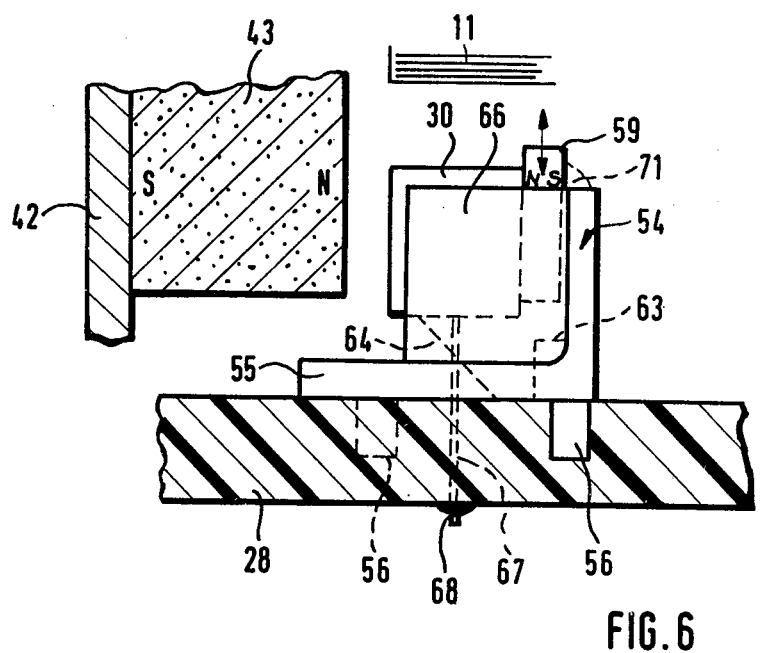
FIG. 6 is a side view partly in section of the arrangement according to FIG. 5.

This causes a varying torque 130 in the form shown in FIG. 4C. That is, in the two-pulse motor 6, the rotor 40 is additionally accelerated at each rotation for about 180°, and additionally decelerated for the following 180°, producing an undesirable vibrating torque and generally running erratically. The dotted line of curve 100 shows the current behavior including the current in the recovery diodes 147 to 150. In order to avoid such erratic running, the finished printed circuit board 28 with all components, including the voltage regulator 78, is aligned in such a way that the Hall-IC 30 is excited by a magnetic alternating field of an appropriate frequency, which can be produced by means of a separate magnet coil. The currents $i_1$ and $i_2$ are measured and a permanent magnet 59 is pushed into the channel 62 of the mold 54 until the currents $i_1$ and $i_2$ have reached about the same amount. This operation could be set up to be done by an automatic device. In the present case in which the north pole of the rotor magnet 43 causes a prolonged switching period, this is compensated by the polarity of the permanent magnet 59, as shown in FIGS. 5 and 6. In the aligned position, the permanent magnet piece 59 is fixed by a drop of adhesive 71 and the board 28 is released to be assembled in a motor. Thus, a smooth running of the motor is obtained by extremely simple methods.

Arrangement and fixation of the permanent magnet 59 are naturally not limited to the application presented, but a variety of applications results therefrom. Therefore, it would be advantageous to provide permanent magnet pieces having a graduated magnetic field strength for the alignment. For example, permanent magnet pieces made of a so-called rubber magnet with a residual magnetism of 2000 Gauss, or permanent magnet pieces of ceramic material with a residual magnetism of 3600 Gauss. The dimensions of each of these pieces are, for example, 2×3×5 mm.

The difference between these two current pulses $i_1$ and $i_2$ controlled by the Hall-IC 30, is then determined as to its amount and its sign as shown, for example, in FIG. 4B. The sign determines how the permanent magnet piece 59 must be polarized, and the amount of the current determines whether a permanent magnet piece 59 of low residual magnetism or a permanent magnet piece of high residual magnetism must be pushed into the channel 62, or if an alignment is not necessary at all. Past experience has shown that the requirements can be met in practice by such an alignment having only two steps in the positive and two steps in the negative direction and by an omission of the alignment when the amount of current is low. Such an alignment taking place in only a few steps can be easily automated and can also be easily done by a semiskilled worker.

Figure 7:
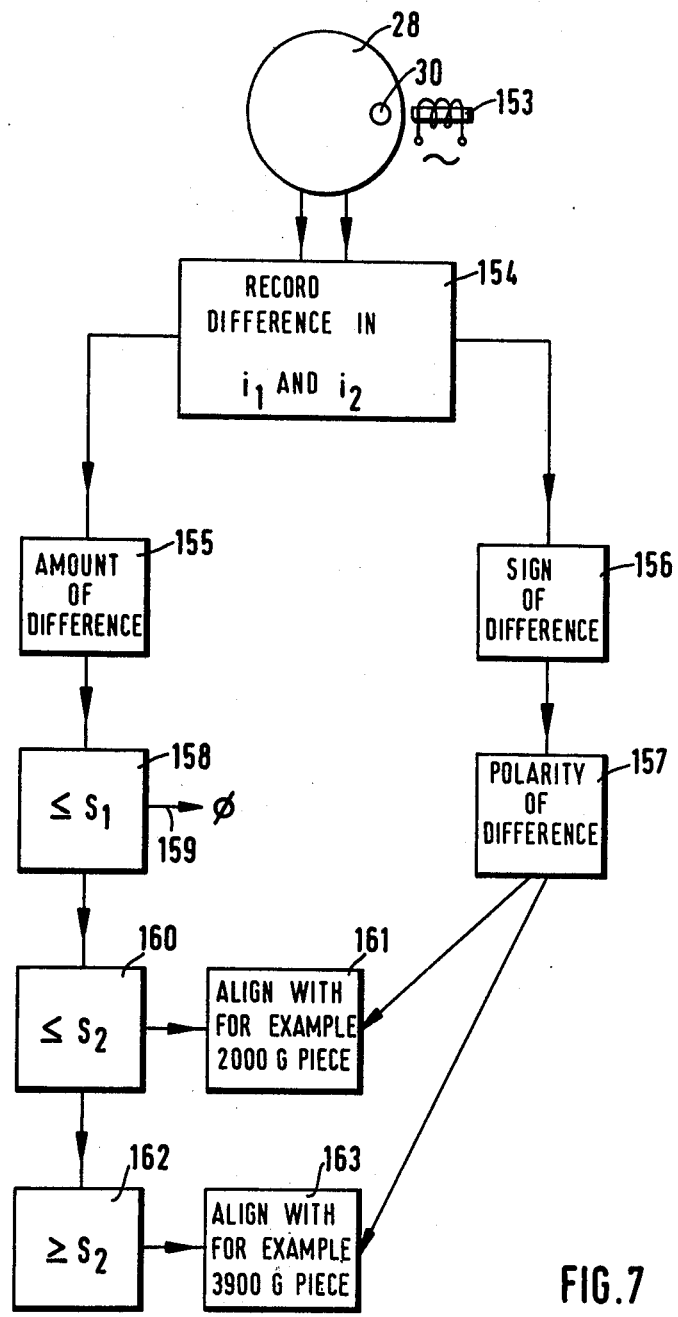
FIG. 7 is a flow chart of a method for accomplishing a principle object of this invention.

In motors with a higher number of pulses, for example, the four-pulse brushless direct current motor, such four-pulse motors could be provided with two Hall-ICs, the individual Hall-ICs being successively aligned according to the method described. FIG. 7 shows a preferable embodiment of the method according to the present invention. At the very top, the board 28 with the switching elements and the Hall-IC 30 is schematically shown. It is connected to a testing device, and with a separate electromagnet 153, the Hall-IC 30 is excited by an alternating field.

The currents $i_1$ and $i_2$ (FIG. 4B) flowing in a stator winding connected therewith, are measured, and at point 154 their difference is recorded.

At point 155 the amount of this difference is determined, which corresponds to the current I in FIG. 4B. At point 156 the sign of this difference is determined and from this the polarity is determined at point 157 with which the permanent magnet piece 59 must be pushed into the channel 62 with either the north pole or with the south pole turned towards the Hall-IC 30.

At point 158 the amount determined is compared to a first low threshold value. If it is lower, no alignment takes place (see arrow 159). On the other hand, if the amount is higher, it is compared at point 160 to a higher threshold value, namely $S_2$. When it is lower than $S_2$, the alignment takes place at point 161 by means of a permanent magnet piece 59 of type 1 having, for example, a residual magnetism of 2000 Gauss, the polarity having been determined at point 157. When the amount is higher than $S_2$ (point 162), the alignment takes place at point 163 by means of a permanent magnet piece of type 2 having, for example, 3900 Gauss, the polarity having been determined at point 157. The system can naturally be further developed. For example, by being provided with a further step having a residual magnetism of 5000 Gauss and a threshold $S_3$. Such a process works extremely fast and therefore furnishes a simple structure and low operating costs.

The invention can naturally be adapted in the same way for all galvano-magnetic sensors characterized by switching asymmetries.

Figures 8, 9:
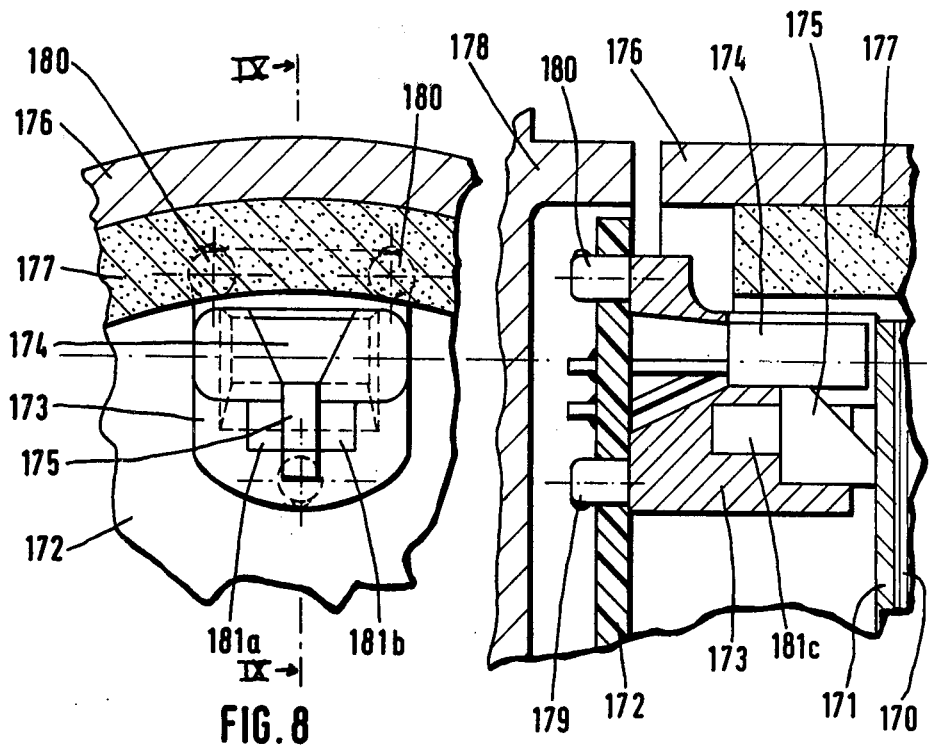
FIG. 8 is a broken away view of an alternative structure for holding a magnetic flux-sensitive control member of the invention.
FIG. 9 is a sectional view of the structure taken along the line IX—IX of FIG. 8.

In FIGS. 8 and 9 there is a further embodiment according to the invention with a holder 173 supporting a Hall-IC 174. As the geometrical dimensions, especially the length of the Hall-IC 174, have necessarily large tolerances (±0.5 mm) in this embodiment other than in FIGS. 5 and 6 are not oriented to the side of the wires (three legs) but to the opposite side. This is done such that the Hall-IC 174 with its legs is plugged in the circuit board 172 and the supporting elements 173 is put over it to such a degree that the plane with the centering bolts 179, 180 is adjacent the circuit board 172. As the middle of the three legs of the Hall-IC must be bent because there is a need for a minimum certain distance between the soldering-points, there is a mechanical tension in the axial direction. This causes a certain mechanical resistance which presses the Hall-IC 174 with its upper side onto the interior surface of the supporting element 173, until this Hall-IC is fixed by soldering. The supporting element 173 is positioning the Hall-IC 174 on all sides at the same time keeping it in a small radial tolerance-field to the surrounding rotating magnet-ring 177. To achieve a good switching performance, the distance, i.e., the air-gap between the magnet-ring 177 and the Hall-IC, should be small, but because of mass production circumstances there is a distance necessary because the tolerance in thickness of the magnet-ring 177, preferably bound in plastics (so-called gum-magnet) cannot be very small. Therefore on the opposite side closer to the rotation axes there is a soft iron part 175 which is reducing the magnetic resistance of the magnetic-circuit for the Hall-IC in the circuit of the parts 174, 177, 170 (stator laminations) 175, shall be greatly reduced and have a very effective influence on the switching function of the Hall-IC. The soft iron part 175 is a plain cut-out piece. This part 175 is fitted in a certain pocket in the supporting element 173 and sealed with a little drop of resin or adhesive.

It is noted that the soft iron piece 175 as illustrated is of a generally different size and shape than the permanent magnet piece 59 and that the support element 173 includes a channel 181 similar to channel 62 of the holder 54. The soft iron piece 175 does not fill this channel 181, their remaining open areas 181a and 181b (FIG. 8) of depth 181c (FIG. 9). Thus, the support will accept either the permanent magnet piece 59 or the soft iron piece 175. Furthermore, it may be desirable to obtain the final result by a combination of the two pieces, and such combination is included in this invention.

Although the invention has been described in connection with a preferred embodiment and an alternative, other alternatives, modifications, and variations may be apparent to those skilled in the art in view of the foregoing description. Accordingly, it is intended to embrace all such alternatives, modifications and variations as fall within the spirit and scope of the appended claims.

We claim:

1. Method of aligning a brushless d.c. motor of even number pulses having commutation control by at least one magnetic flux-sensitive control member, comprising:
   measuring the stator winding current flowing alternately in both directions;
   determining the amount of the difference of current in both directions;
   comparing to a predetermined threshold current value;
   determining the polarity of the difference; and
   locating a permanent magnet piece inwardly adjacent when the current is above said predetermined threshold value polarized and relatively positioned with respect to said control member to minimize the difference in the alternately flowing stator current.

2. Method of aligning a brushless d.c. motor of even number pulses having commutation control by at least one magnetic flux-sensitive control member, comprising:
   measuring the stator winding current flowing alternately in both directions;
   determining the amount of the difference of current in both directions;
   compare a predetermined threshold current value;
   determining the polarity of the difference; and
   locating a soft iron piece inwardly adjacent said control member when the current is above said predetermined threshold value in a position relative to said control member to minimize the difference in the alternately flowing stator current.

3. A method in accordance with either claim 1 or 2 wherein said magnetic flux-sensitive control member is a Hall-IC.

4. A method in accordance with either claim 1 or claim 2, wherein said alignment is done during original assembly of the motor.

5. A method in accordance with claim 3 wherein the Hall-IC is alternately excited by a separate electromagnetically produced alternating field.

6. A method in accordance with claim 5 wherein at least two pieces of a permanent magnet with different magnetic field strengths are used in order to obtain an approximate alignment by using the permanent magnet piece with the low field strength or the permanent magnet piece with the high field strength in accordance with the magnitude of the amount of current difference determined.

7. A method in accordance with claim 6 wherein one of said pieces has a residual magnetism of 2000 Gauss and the other has a residual magnetism of 3900 Gauss.

8. A method in accordance with claim 7 wherein a third piece is used having a residual magnetism of 5000 Gauss.

9. Device for aligning a brushless d.c. motor of even number pulses having commutation control by at least one magnetic flux-sensitive control member that switches in response to an alternating polarity of a magnetic field, said device comprising:
   a holder having a channel containing said control member; and
   a second channel at least partially receiving and holding in close proximity thereto at the same circumferential location in the motor an additional permanent magnet source of constant polarity to change the zero level of resulting fluxes acting on said control member.

10. A device in accordance with claim 9 wherein said holder is made of molded plastic and has provision for mounting on a printed circuit board.

11. A device in accordance with either claim 9 or 10 wherein the control member is a Hall-IC and said device is provided with a recess for at least a partly form-fit reception of the Hall-IC.

12. A device in accordance with claim 11 wherein the motor includes an outer rotor carrying a permanent magnet having opposite poles to which the Hall-IC responds, wherein said device is provided with a recess for the permanent magnet piece, the recess being located inwardly of the Hall-IC on the side opposite the rotating permanent magnet.

13. A brushless d.c. motor comprising:

a stator;

a permanent magnet rotor having opposite poles and positioned with respect to said stator to provide a radially directed air gap therebetween;

a stationary magnetic flux-sensitive control member that switches in response to an alternating polarity of a magnetic field; and a separate permanent magnet piece located inwardly adjacent said stationary control member polarized and positioned relative to said control member to minimize any asymmetric switching of said control member.

14. A device in accordance with claim 9 further including a soft iron piece in combination with said additional permanent magnet source in said second channel.

* * * * *

UNITED STATES PATENT AND TRADEMARK OFFICE
CERTIFICATE OF CORRECTION

PATENT NO. : 4,482,849

DATED : November 13, 1984

INVENTOR(S) : Doemen et al.

It is certified that error appears in the above-identified patent and that said Letters Patent is hereby corrected as shown below:

Column 2, Line 17, "9" should read --19--.

Column 3, Line 12, "laterals" should read --lateral--.

Column 3, Line 13, after "slightly" insert --springy--.

Signed and Sealed this

Eleventh Day of June 1985

[SEAL]

Attest:

DONALD J. QUIGG

Attesting Officer     Acting Commissioner of Patents and Trademarks